US008689451B2

(12) United States Patent
Cigarini

(10) Patent No.: US 8,689,451 B2
(45) Date of Patent: Apr. 8, 2014

(54) ROTATING HEAD FOR HEDGE TRIMMERS

(75) Inventor: Enrico Cigarini, Reggio Emilia (IT)

(73) Assignee: Tecomec S.R.L., Reggio Emilia (IT)

( * ) Notice: Subject to any disclaimer, the term of this patent is extended or adjusted under 35 U.S.C. 154(b) by 315 days.

(21) Appl. No.: 13/294,833

(22) Filed: Nov. 11, 2011

(65) Prior Publication Data
US 2012/0131804 A1 May 31, 2012

(30) Foreign Application Priority Data

Nov. 29, 2010 (IT) ................ M02010A0343

(51) Int. Cl.
*B26B 7/00* (2006.01)
(52) U.S. Cl.
USPC .............................. 30/276; 30/347
(58) Field of Classification Search
USPC ................... 30/347, 276, 299, 300
See application file for complete search history.

(56) References Cited

U.S. PATENT DOCUMENTS

| | | | | |
|---|---|---|---|---|
| 4,162,575 A | * | 7/1979 | Ballas | 30/347 |
| 4,169,311 A | * | 10/1979 | Evenson et al. | 30/276 |
| 4,366,621 A | * | 1/1983 | Mitchell | 30/276 |
| 4,366,622 A | * | 1/1983 | Lombard | 30/276 |
| 4,411,069 A | * | 10/1983 | Close et al. | 30/276 |
| 4,419,822 A | * | 12/1983 | Harris | 30/276 |
| 4,475,287 A | * | 10/1984 | Beihoffer | 30/276 |
| 4,580,394 A | * | 4/1986 | Baba | 56/12.7 |
| 4,599,796 A | * | 7/1986 | Baba | 30/276 |
| 4,882,843 A | * | 11/1989 | Baba | 30/276 |
| 4,926,557 A | * | 5/1990 | Haupt | 30/276 |
| 5,020,224 A | * | 6/1991 | Haupt | 30/276 |
| D346,727 S | * | 5/1994 | Eriksson | D8/8 |
| 5,339,526 A | * | 8/1994 | Everts | 30/276 |
| 6,912,789 B2 | * | 7/2005 | Price, III | 30/276 |
| 7,878,097 B2 | * | 2/2011 | Strader | 83/13 |
| 8,025,249 B2 | | 9/2011 | Alliss et al. | |
| 2004/0134078 A1 | | 7/2004 | Pfaltzgraff | |
| 2005/0044833 A1 | * | 3/2005 | Nystrom | 56/12.7 |
| 2005/0262705 A1 | | 12/2005 | Pfaltzgraff | |
| 2008/0092398 A1 | * | 4/2008 | Hurley et al. | 30/276 |
| 2008/0120847 A1 | | 5/2008 | Alliss | |
| 2010/0064530 A1 | | 3/2010 | Pfaltzgraff | |
| 2010/0307011 A1 | * | 12/2010 | Hurley et al. | 30/320 |
| 2013/0283752 A1 | * | 10/2013 | Lister et al. | 56/295 |

FOREIGN PATENT DOCUMENTS

| | | |
|---|---|---|
| EP | 1358787 A1 | 11/2003 |
| GB | 2417664 A | 3/2006 |
| WO | 2009067184 A2 | 5/2009 |

* cited by examiner

*Primary Examiner* — Sean Michalski
(74) *Attorney, Agent, or Firm* — Pearne & Gordon LLP

(57) ABSTRACT

A rotating head for hedge trimmers, comprising: a support body (2, 3), predisposed to be fixed to a drive shaft of a hedge trimmer, which support body (2, 3) comprises a first half-shell (2) and a second half-shell (3), reciprocally and releasably couplable; at least a snap-fit engagement (4, 5), comprising a male connector (4) predisposed to snap-fit into an engagement seating (5); the male connector (4) is flanked to the internal side of a peripheral wall (31).

8 Claims, 4 Drawing Sheets

ROTATING HEAD FOR HEDGE TRIMMERS

The present invention relates to a rotating head for hedge trimmers.

There are currently present on the market various types of rotating heads for hedge trimmers. In general, a rotating head comprises a support body designed to be fixed to the drive shaft of the hedge trimmer and receive the rotational motion produced by the latter. In many examples of rotating heads, the support body houses within it a bobbin of flexible wire. The two end sections of the bobbin of wire are made to project radially from the support body for a predetermined length so as to function as cutting elements during the rotation of the support body.

In many cases the support body is divided into two half-shells releasably coupled together in order to enable access to the bobbin of wire and/or for various maintenance operations. The coupling between the two half-shells composing the support body is often achieved by means of snap-fit engagements in which a male connector, endowed with a wedge-like end portion with a projecting base, is inserted into an engagement seating that is open toward the outside. The seating is provided with an edge against which the projecting base at the end of the male connector abuts in such a way that, once inserted into the seating, the male connector can no longer be extracted simply by pulling. In order to extract the male connector it is necessary to press the end portion of the male connector inwardly, so as to disengage the projecting base of the male connector from the edge of the seating. Pressing on the end portion of the male connector is possible through the opening of the engagement seating.

One drawback of the above-described rotating heads is represented by the fact that the end portions of the male connectors, which are accessible through the opening of the engagement seating to enable detachment of the rotating head, are also exposed to unwanted impacts against obstacles or against the end portions of the flexible wire. Such unwanted impacts can lead to the disengagement of the male connectors from the seatings thereof, with consequent risks of the rotating head coming detached during the rotation. This represents a serious hazard, given the high speed of rotation of the rotating head as well as the nearness it assumes relative to the lower limbs of the user during operation.

An example of a rotating head of the known type is described in document WO 2009/067184.

The object of the present invention is to solve the technical problems that can be seen in the known types of rotating heads for hedge trimmers.

One advantage of the rotating head according to the present invention is that it allows the end portions of the male connectors to be protected in a very effective manner, thus eliminating the risks that they may undergo unwanted impacts during the functioning of the rotating head. Another advantage of the rotating head according to the present invention is that of being simple and effective in its operation and use.

Further characteristics and advantages of the present invention will become more apparent from the approximate, and hence non-restrictive, description provided hereunder with reference to the appended figures in which.

Figure 1:
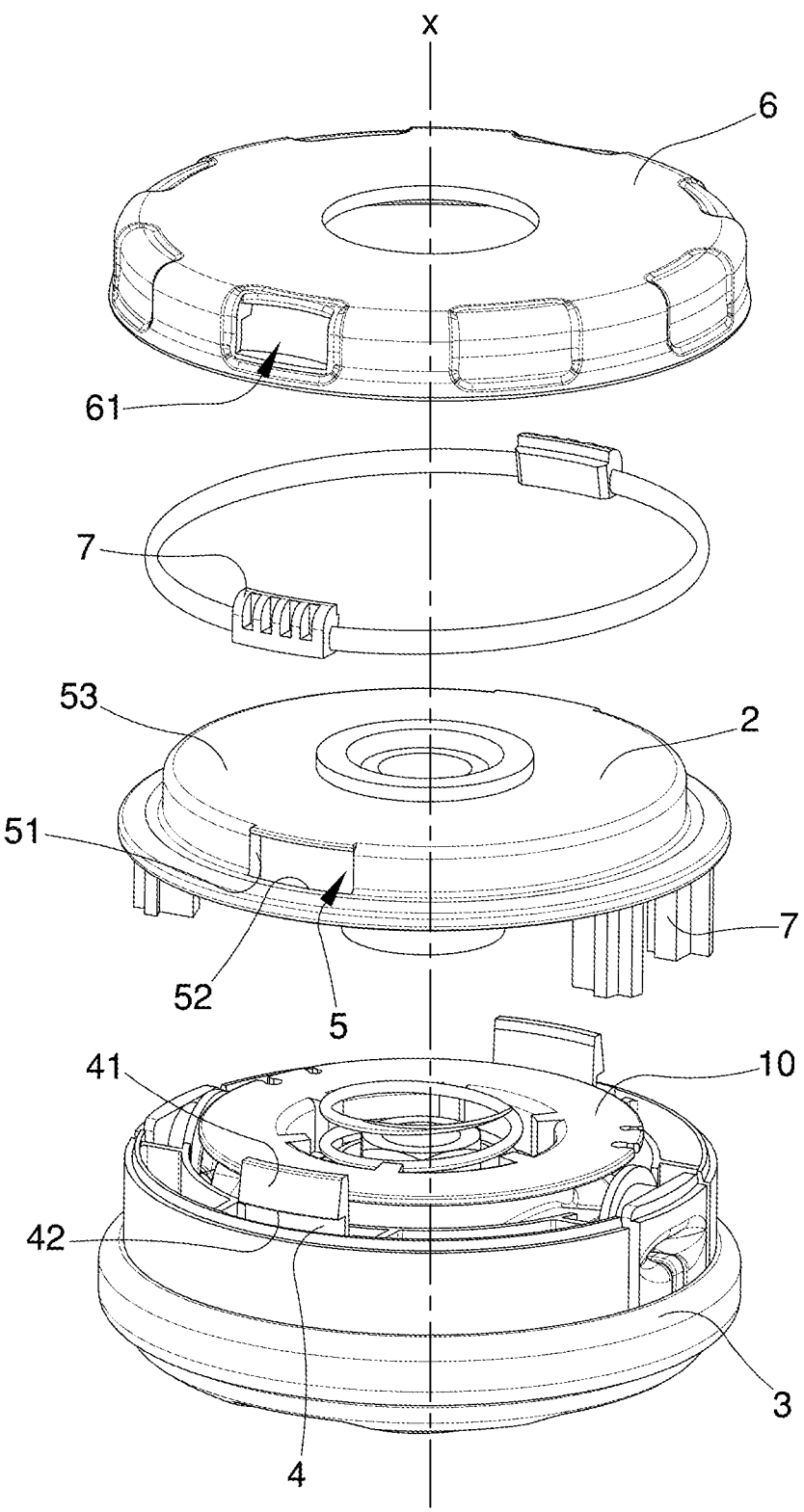
FIG. 1 shows an exploded view of a first embodiment of the rotating head.
Figure 2:
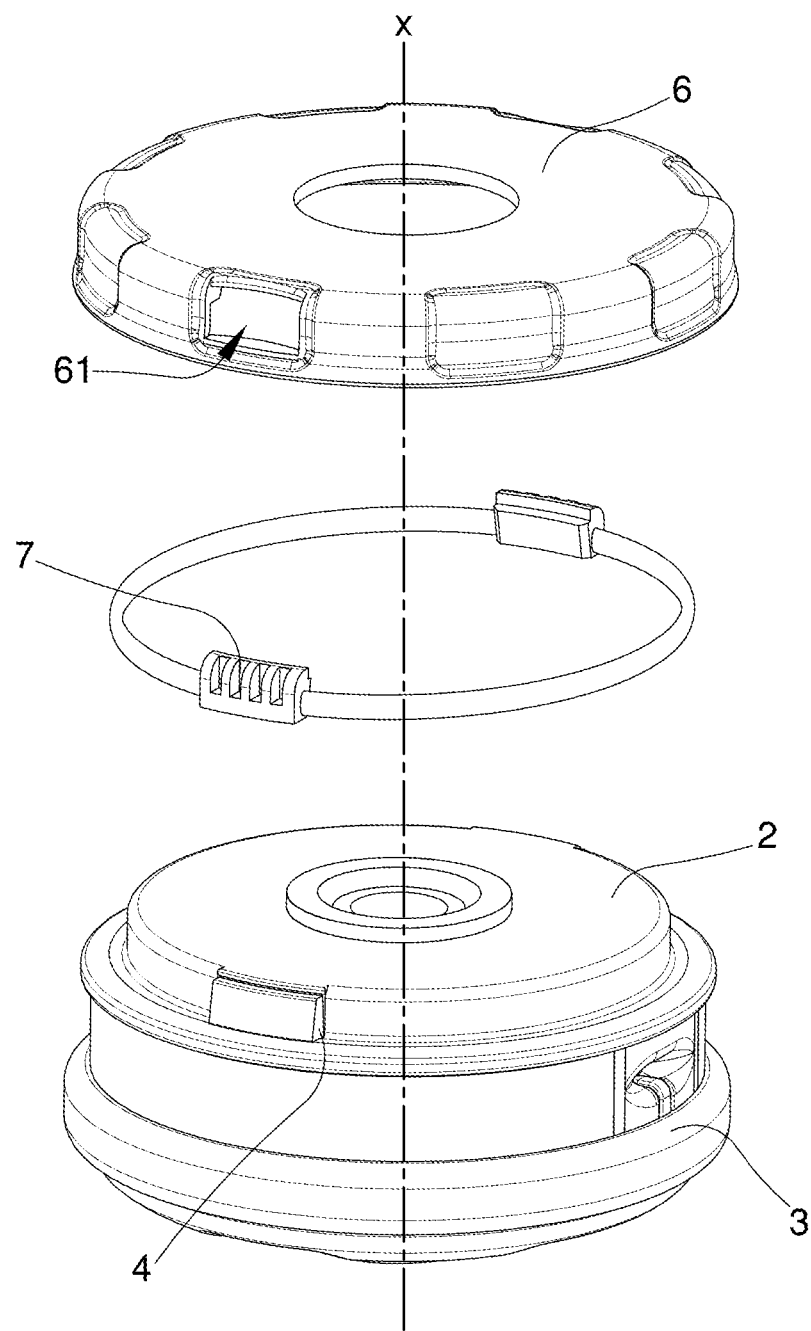
FIG. 2 shows the rotating head partially assembled, with some components still in an exploded view.

With reference to the above-mentioned figures, the rotating head for hedge trimmers according to the present invention comprises a support body 2,3, which is designed to be fixed to the drive shaft of a hedge trimmer and to rotate about a main axis X, and comprises a first half-shell 2 and a second half-shell 3, reciprocally and releasably couplable. At least one snap-fit engagement is provided to enable the releasable coupling between the two half-shells 2,3. Preferably, the rotating head comprises two snap-fit engagements 4,5 set in diametrically opposed positions.

Each snap-fit engagement comprises a male connector 4, endowed with a wedge-like end portion 41 with a projecting base 42. The projecting base 42 of the end portion 41 is facing toward the other end of the male connector 4 and substantially forms a step facing toward said other end of the male connector 4.

Figure 5:
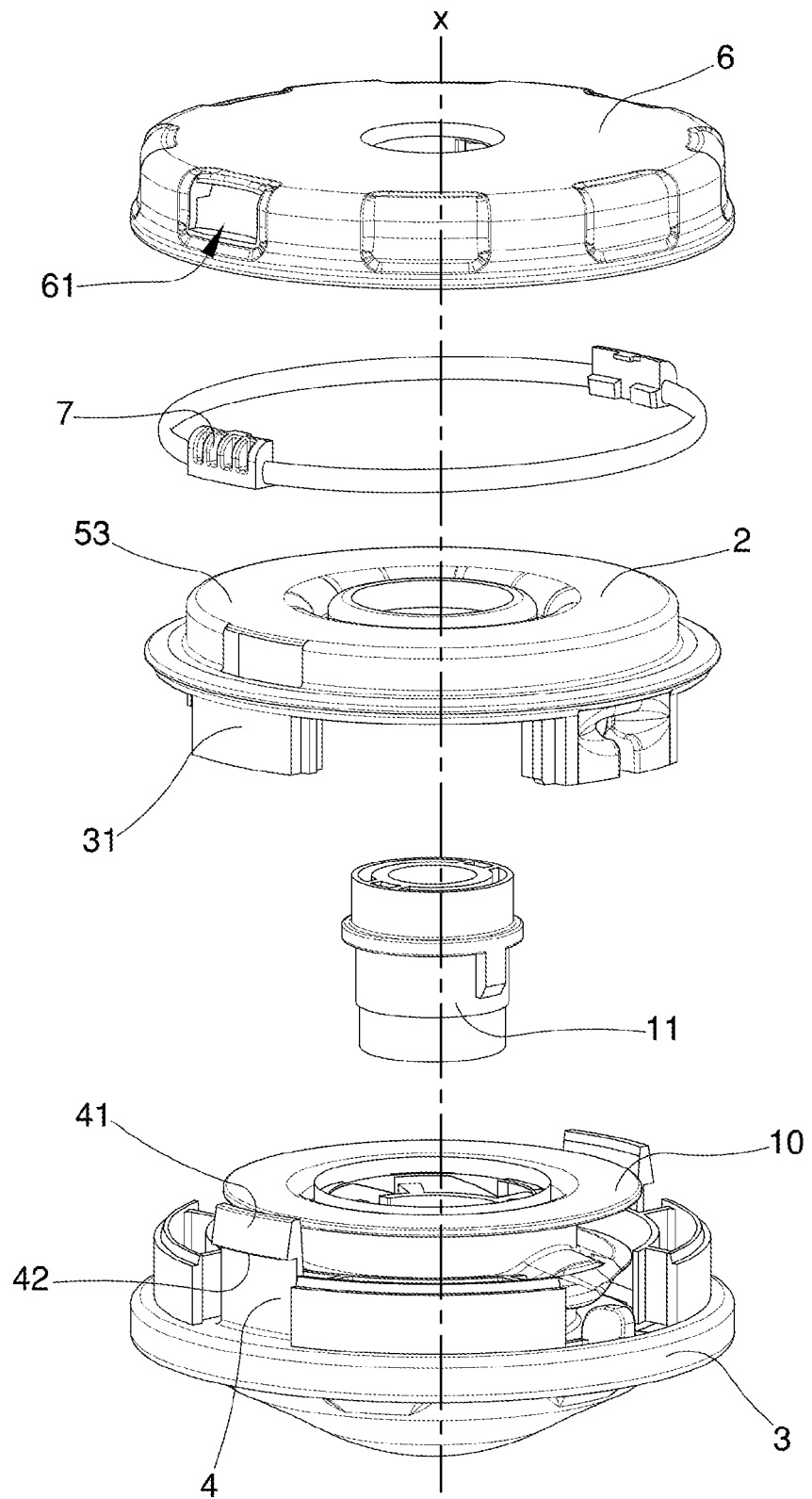
FIG. 5 shows an exploded view of a second embodiment of the rotating head.

The male connector 4 can be connected to the first half-shell 2 or second half-shell 3. In a preferred but not exclusive embodiment, the male connector 4 is associated with the second half-shell 3. In particular, the male connector 4 is connected in proximity of the peripheral edge of the second half-shell 3 and flanks an internal side of a peripheral wall 31 of the second half-shell 3, in such a way that only the end portion 41 projects above the peripheral wall 31. Advantageously, this means that when the first and second half-shells 2,3 are reciprocally coupled, the male connector 4 is almost entirely protected by the peripheral wall 31, with the sole exception of the end portion 41. In this manner, most of the male connector 4 is protected against unwanted impacts, the only exception being the end portion 41, which is in any case in an upper zone of the support body 2,3 and is thus for this reason already effectively protected. In a slightly different but technically wholly equivalent embodiment, the peripheral wall 31 could be solidly constrained to the first half-shell 2 instead of to the second half-shell 3. The technical effect would be the same since once the first and second half-shells have been reciprocally coupled, the peripheral wall 31 will be disposed externally to the side of the male connector 4, protecting it in any case against impacts. As can be seen in FIG. 5, the peripheral wall 31 could be in the form of one or more distinct segments associated with the first half-shell 2 and positioned in such a way as to abut externally on a respective male connector 4 when the two half-shells 2,3 are reciprocally coupled.

The snap-fit engagement further comprises an engagement seating 5 for the male connector 4, which engagement seating 5 is provided with a window 51 designed to enable access to the end portion 41 of the male connector 4. The engagement seating 5 is further provided with a hooking edge 52 against which the projecting base 42 of the end portion 41 of the male connector 4 can abut. During insertion of the male connector 4 into the engagement seating 5, the end portion 41, in virtue of its wedge-like conformation, slides in contact with the hooking edge 52, causing the male connector to bend away from the hooking edge 52 itself. When the projecting base 42 of the end portion 41 gets beyond the hooking edge 52, the male connector 4 bends back toward the initial configuration. The projecting base 42 finds space through the window 51 to allow the elastic return of the male connector 4, and disposes itself in contact with or abutted against the hooking edge 52. From this position, any sliding that tends to extract the male connector 4 from the engagement seating 5 is prevented by the interference between the projecting base 42 and the hooking edge 52. To enable extraction of the male connector 4 it is necessary to bend the end portion 41 inwardly by exerting pressure on the end portion itself through the window 51 of the engagement seating 5 until the projecting base 41 is disengaged from the hooking edge 52.

In the preferred embodiment of the rotating head, the engagement seating 5 is fashioned on the first half-shell 2. Advantageously, the engagement seating 5 is positioned in proximity of an upper surface 53 of the first half-shell 2, so that the window 51 is situated in proximity of said upper surface 53 of the first half-shell 2. As alluded to previously, this portion of the rotating head, i.e. the portion near the upper surface of the first shell 2, is relatively far from the portion most subject to impacts, which is the middle and lower portion of the rotating head.

Figure 3:
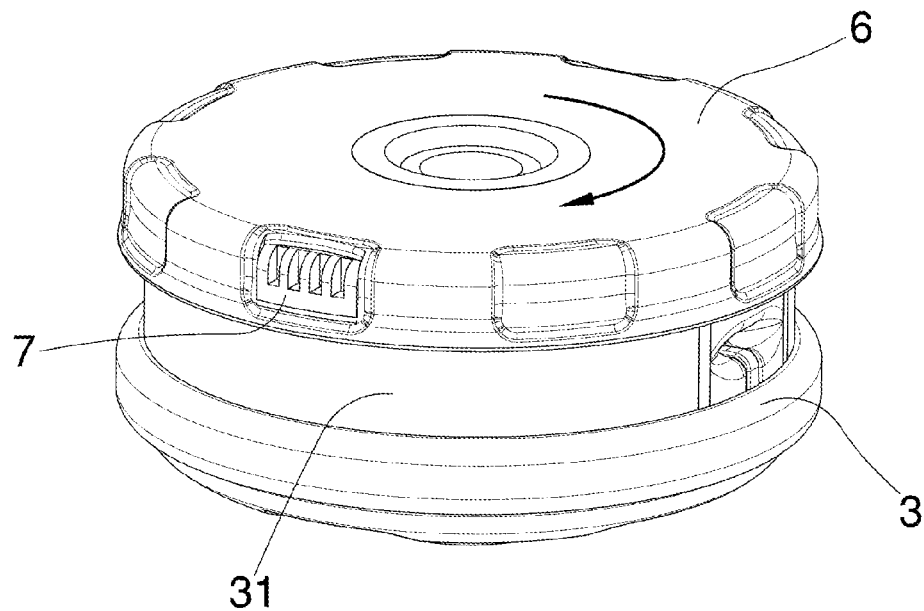
FIGS. 3 and 4 show the assembled rotating head in two distinct operative configurations.
Figure 4:
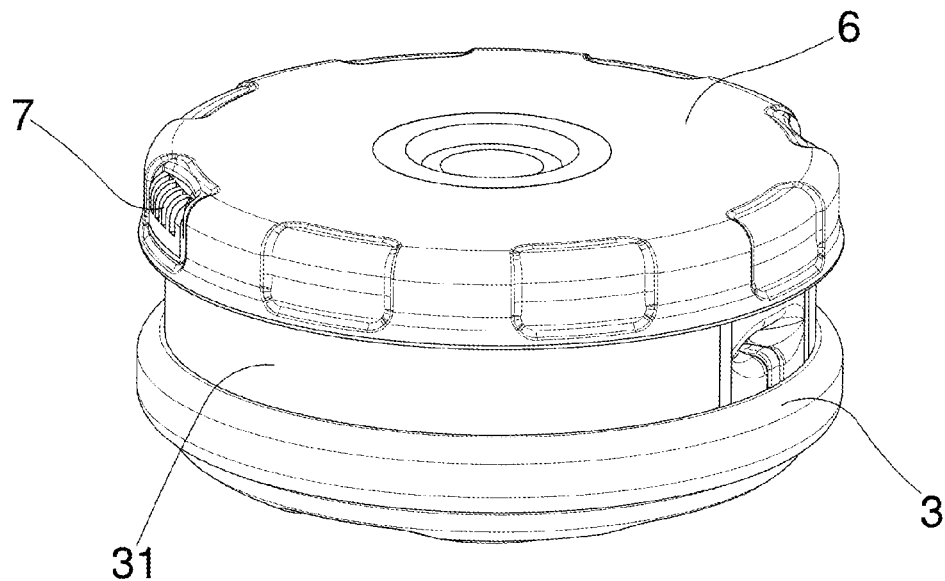

The rotating head comprises a cover 6 associated with the support body 2,3. In the preferred embodiment, the cover 6 is associated with the first half-shell 2 and can be solidly constrained thereto or else it can be mobile, preferably rotatingly, between at least a safety position, in which the cover covers the window 51 and prevents access to the end portion 41 of the male connector 4 (FIG. 4), and an access position, in which it frees the window 51 and enables access to the end portion 41 of the male connector 4 (FIG. 3). At least one opening 61 is configured in the cover 6 so as to face the window 51 of the engagement seating 5. If the cover 6 is solidly constrained to the first half-shell 2, the opening 61 will always be facing the window 51. If the cover 6 is instead mobile between the safety position and the access position, the opening 61 will face the window 51 in the access position of the cover 6 (FIG. 3). When the cover 6 is in its safety position, the snap-fit engagement and in particular the end portion of the male connector 4 and the window 51 of the engagement seating 5 will be absolutely protected against every type of unwanted impact, making the rotating head absolutely safe with respect to the risk of coming detached during operation following an impact against the snap-fit engagement.

Preferably, a button 7 is associated with the cover 6 and is designed to be positioned in contact with the end portion 41 of the male connector 4. The button 7 is set inside the cover 6 and projects from the opening 61 of the cover 6. The button 7 offers the advantage of considerably facilitating the exerting of pressure on the end portion 41 of the male connector 4 in order to detach the rotating head. If the cover 6 is solidly constrained to the first half-shell 2, the button 7 will always be aligned with the end portion 41 of the male connector 4. If the cover 6 is mobile relative to the first half-shell 2, the button 7 will be aligned with the end portion 41 of the male connector 4 only in the access position.

The cover 6 may take on a further advantageous function in the case of a rotating head of the type commonly referred to as "tap and go". As a cutting element, these rotating heads, widely available on the market, use a flexible wire wound into a skein on a reel contained within the rotating head. Two end sections of the skein of flexible wire project radially from the support body through two through-holes. The rotating head is provided with a mechanism that allows a controlled amount of flexible wire to be unwound, by means of a brief pressing on a lower body of the rotating head obtained by striking the rotating head on the ground, in order to restore the length of the end sections of the skein of wire which become worn and break during use. The rotating heads of this type comprise a reel 10 for winding a skein of flexible wire. To enable a new skein of flexible wire to be wound, the reel 10 must be rotated in a predetermined direction of rotation about a main axis of rotation X, which is normally the axis of rotation of the rotating head. The cover 6 can be connected to the reel 10 in rotation about the main axis X in the direction of rotation for winding the skein of flexible wire. In this manner, the cover 6 offers an ergonomic rotation grip for winding a new skein of flexible wire. As can be seen in FIG. 5, the rotating connection between the cover 6 and the reel can be obtained by means of a shaft 11, which is coaxial with both the reel 10 and the cover 6. At one of its ends the shaft 11 is engaged with the reel 10 in a prismatic coupling. At the other end, the shaft 11 is constrained in a prismatic coupling to the cover 6, passing freely through a hole fashioned in the first half-shell 2, so that the rotation of the shaft 11 does not interfere with the first half-shell 2.

The invention claimed is:

1. A rotating head for hedge trimmers, comprising: a support body (2, 3), predisposed to be fixed to a drive shaft of a hedge trimmer, which support body (2, 3) comprises a first half-shell (2) and a second half-shell (3), reciprocally and releasably couplable; at least a snap-fit engagement (4, 5), comprising a male connector (4) predisposed to snap-fit into an engagement seating (5); the male connector (4) is flanked to the internal side of a peripheral wall (31); characterised in that it comprises a cover (6) associated to the support body (2, 3) and provided with an opening (61) through which the snap-fit engagement (4, 5) is accessible.

2. The rotating head of claim 1, wherein the engagement seating (5) is positioned in proximity of an upper surface (53) of the first half-shell (2).

3. The rotating head of claim 2, comprising a reel (10) predisposed for winding a skein of flexible wire, said cover (6) being connected to the reel (10) in rotation about a main axis (X) in at least a rotation direction.

4. The rotating head of claim 3, wherein the rotating connection between the cover (6) and the reel (10) is obtained by means of a shaft (11) which, at an end thereof, is engaged in a prismatic coupling to the reel (10), while at another end thereof it is constrained in a prismatic coupling to the cover (6).

5. The rotating head of claim 1, wherein said male connector (4) comprises an end portion (41) shaped such as to snap-engage in the engagement seating (5), which engagement seating (5) is provided with a window (51) through which access can be gained to the end portion (41) of the male connector (4) in order to cause disengagement of the end portion (41) from the engagement seating (5).

6. The rotating head of claim 5, wherein the cover (6) is mobile between at least a security position, in which the cover (6) covers the window (51) and prevents access to the end portion (41) of the male connector (4), and an access position, in which the opening (61) faces the window (51) and enables access to the end portion (41) of the male connector (4).

7. The rotating head of claim 5, wherein the cover (6) is provided with at least a button (7) which projects from the opening (61) of the cover (6) and is predisposed to be positioned contactingly with the end portion (41) of the male connector (4) in order to facilitate an exerting of a pressure on the end portion (41) of the male connector (4).

8. The rotating head of claim 1, wherein the cover (6) is associated to the first half-shell (2) and is solidly constrained thereto.

* * * * *